United States Patent
Strater et al.

(10) Patent No.: US 10,952,059 B2
(45) Date of Patent: Mar. 16, 2021

(54) METHOD AND SYSTEM FOR WIRELESS EXTENDER ONBOARDING

(71) Applicant: ARRIS Enterprises LLC, Suwanee, GA (US)

(72) Inventors: Jay Strater, San Diego, CA (US); Gregory Nakanishi, San Diego, CA (US); Christophe Piel, Puteaux (FR); Kurt Alan Lumbatis, Dacula, GA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 168 days.

(21) Appl. No.: 16/228,727

(22) Filed: Dec. 20, 2018

(65) Prior Publication Data

US 2020/0204974 A1   Jun. 25, 2020

(51) Int. Cl.
| | |
|---|---|
| H04L 29/00 | (2006.01) |
| H04W 8/00 | (2009.01) |
| H04B 17/318 | (2015.01) |
| H04W 12/00 | (2021.01) |
| H04B 7/155 | (2006.01) |
| H04W 16/26 | (2009.01) |

(52) U.S. Cl.
CPC ........ *H04W 8/005* (2013.01); *H04B 7/15507* (2013.01); *H04B 17/318* (2015.01); *H04W 12/003* (2019.01); *H04W 16/26* (2013.01)

(58) Field of Classification Search
CPC ... H04W 8/005; H04W 16/26; H04W 12/003; H04B 17/318; H04B 7/15507; H04L 29/06619; H04L 63/0281; H04L 2209/76
See application file for complete search history.

(56) References Cited

U.S. PATENT DOCUMENTS

| | | | |
|---|---|---|---|
| 2011/0158127 A1* | 6/2011 | Duo | H04W 48/10 370/254 |
| 2015/0317467 A1 | 11/2015 | Rattner et al. | |
| 2017/0202037 A1 | 7/2017 | Hong et al. | |

OTHER PUBLICATIONS

International Search Report dated Mar. 13, 2020 in International (PCT) Application No. PCT/US2019/067860.

* cited by examiner

Primary Examiner — Jeffrey C Pwu
Assistant Examiner — Helai Salehi
(74) Attorney, Agent, or Firm — Wenderoth, Lind & Ponack, L.L.P.

(57) ABSTRACT

A method for new wireless extender onboarding in a wireless network includes scanning a machine readable indicia on the new wireless extender, transmitting an identifier represented by the machine readable indicia to a network gateway of the wireless network, computing a secure hash of the identifier provided into a proprietary information element, transmitting the secure hash to existing wireless extenders in the wireless network, communicating beacons comprising the secure hash to the new wireless extender, determining a strongest received signal strength indication from received signal strength indications associated with the network gateway and the existing wireless extenders, and initiating a Wi-Fi Protected Setup (WPS) pairing session with one of the network gateway and the existing wireless extenders associated with the strongest received signal strength.

19 Claims, 5 Drawing Sheets

METHOD AND SYSTEM FOR WIRELESS EXTENDER ONBOARDING

FIELD

The present disclosure relates to the onboarding of wireless extenders in a wireless network, specifically the onboarding of a generic wireless extender using an application on a client device.

BACKGROUND

Home wireless networks include residential gateways and various access points, such as wireless extenders. The wireless extenders may be connected downstream of the gateway or another extender. The wireless networks may be connected by a backhaul link.

Connecting a new wireless extender to a network (e.g., to another residential gateway or extender) via Wi-Fi typically involves establishing a secure backhaul connection for the extender. Connecting a new wireless extender to the wireless network can be technically difficult for a user and involve complicated physical processes at multiple devices. For example, particular sequences of buttons need to be pushed in a specific time frame. In some instances, users must make technical assumptions about the onboarding and existing units, such as, what is the physical range in which units can sufficiently communicate.

SUMMARY

The present disclosure provides a description of systems and methods for new wireless extender onboarding in a wireless network.

The method includes scanning, by an end user device, a machine readable indicia on the new wireless extender, transmitting, by the end user device, an identifier represented by the machine readable indicia to a network gateway of the wireless network, computing, by the network gateway, a secure hash of the identifier provided into a proprietary information element, transmitting, by the network gateway, the secure hash to existing wireless extenders in the wireless network, communicating, by the network gateway and the existing wireless extenders, beacons comprising the secure hash to the new wireless extender, determining, by the new wireless extender, a strongest received signal strength indication from received signal strength indications associated with the network gateway and the existing wireless extenders, and initiating, by the new wireless extender, a Wi-Fi Protected Setup (WPS) pairing session with one of the network gateway and the existing wireless extenders associated with the strongest received signal strength.

The system includes a network gateway connected to the wireless network, an end user device connected to the wireless network, and a plurality of existing wireless extenders currently connected to the wireless network. The network gateway is configured to compute a secure hash of the identifier provided into a proprietary information element and transmit the secure hash to existing wireless extenders in the wireless network. The network gateway and the existing wireless extenders are further configured to communicate beacons comprising the secure hash to the new wireless extender. The new wireless extender is configured to determine a strongest received signal strength indication from received signal strength indications associated with the network gateway and the existing wireless extenders and initiate a Wi-Fi Protected Setup (WPS) pairing session with one of the network gateway and the existing wireless extenders associated with the strongest received signal strength. The end user device is configured to scan a machine-readable indicia on the new wireless extender and transmit an identifier represented by the machine-readable indicia to the network gateway.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Onboardinq a New Wireless Extender

Figure 1:
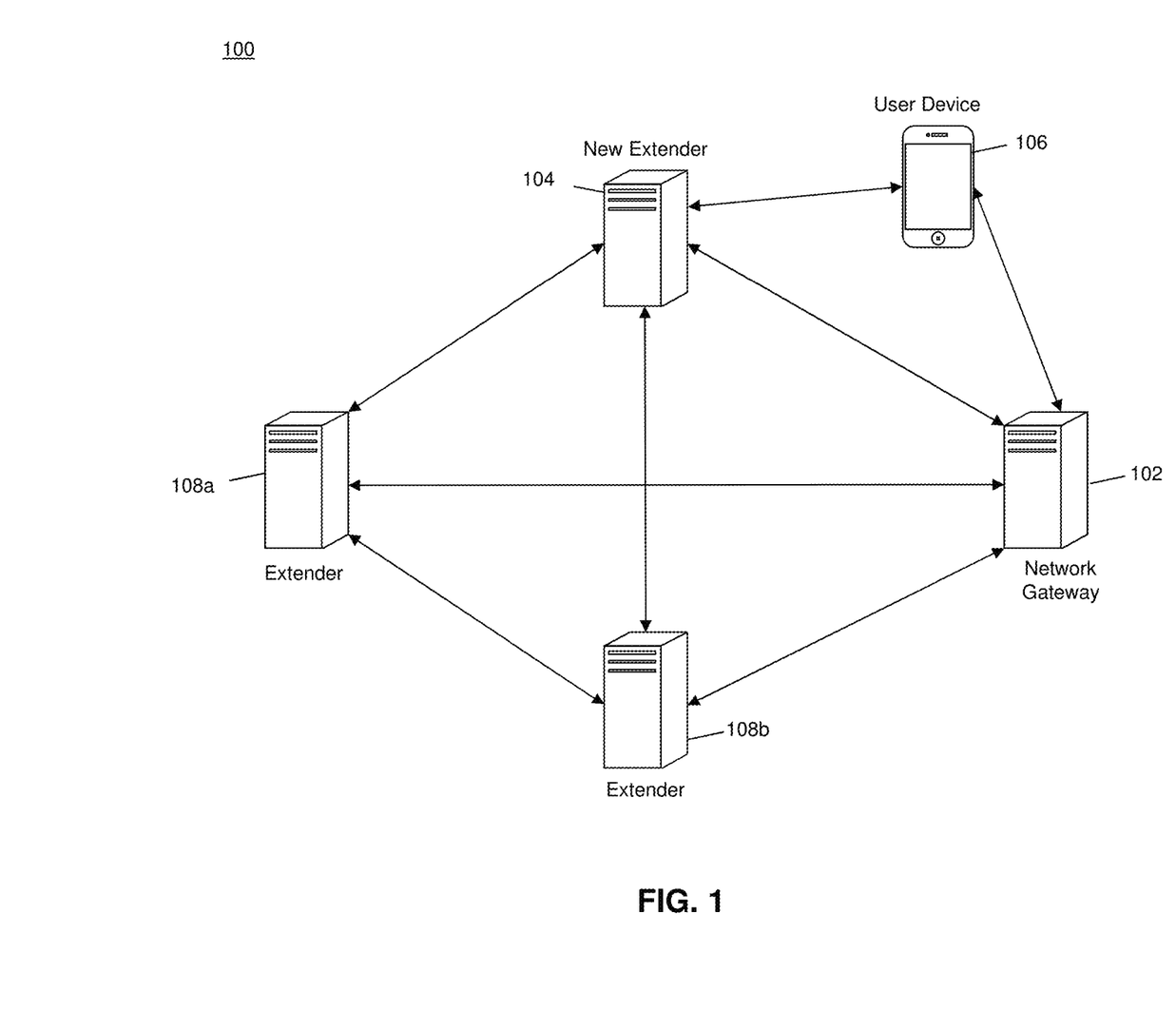
FIG. 1 is a block diagram illustrating a high-level system architecture for onboarding a new wireless extender in a wireless network in accordance with exemplary embodiments.

Referring now to FIG. 1, a system 100 for onboarding a new wireless extender in a wireless network is discussed further. The system 100 may include a network gateway 102, a new wireless extender 104, an end user device 106, and existing wireless extenders 108a, 108b (collectively 108) currently connected to the wireless network. The network gateway 102 may be configured to onboard wireless extenders, as well as perform standard functions of a network gateway (also referred to as a network controller), such as monitor network traffic, monitor channel utilization, perform topography mapping, maintain a firewall, etc. The network gateway 102 may be a standalone device that is connected to the wireless network or may be implemented in another device in the wireless network, such as being part of a router, access point, extender, or other networking device. Each of the components illustrated in the system 100 of FIG. 1 may each be connected to or otherwise operate as part of a single wireless network.

The new wireless extender 104 may comprise a machine-readable indicia on an external sticker. In one embodiment, the machine readable indicia may comprise a quick response (QR) code. The machine readable indicia may represent at least one of: a serial number of the new wireless extender 104, a media access control (MAC) address of the new wireless extender 104, or other suitable data. For instance, in some cases, the machine readable indicia may be encoded with multiple MAC addresses.

The end user device 106 may comprise a mobile application for interfacing with the end user during onboarding. The mobile application may ask the end user to scan the QR code of the new wireless extender 104 to add the new wireless extender 104 to the wireless network. The mobile application may also ask the user to place the new wireless extender 104 in a desired location and power it up. The mobile application may ask the user to confirm the previous step and, in response to confirmation from the user, launch an onboarding process, the onboarding process may be discussed further hereinbelow with regards to FIG. 3. The mobile application may inform the user of the ongoing onboarding process as well as an indication of a successful onboarding operation or a reason for failure. The mobile application may also communicate to the user a guide to place the new wireless extender 104 at an optimal location for wireless coverage.

Network Gateway

Figure 2:
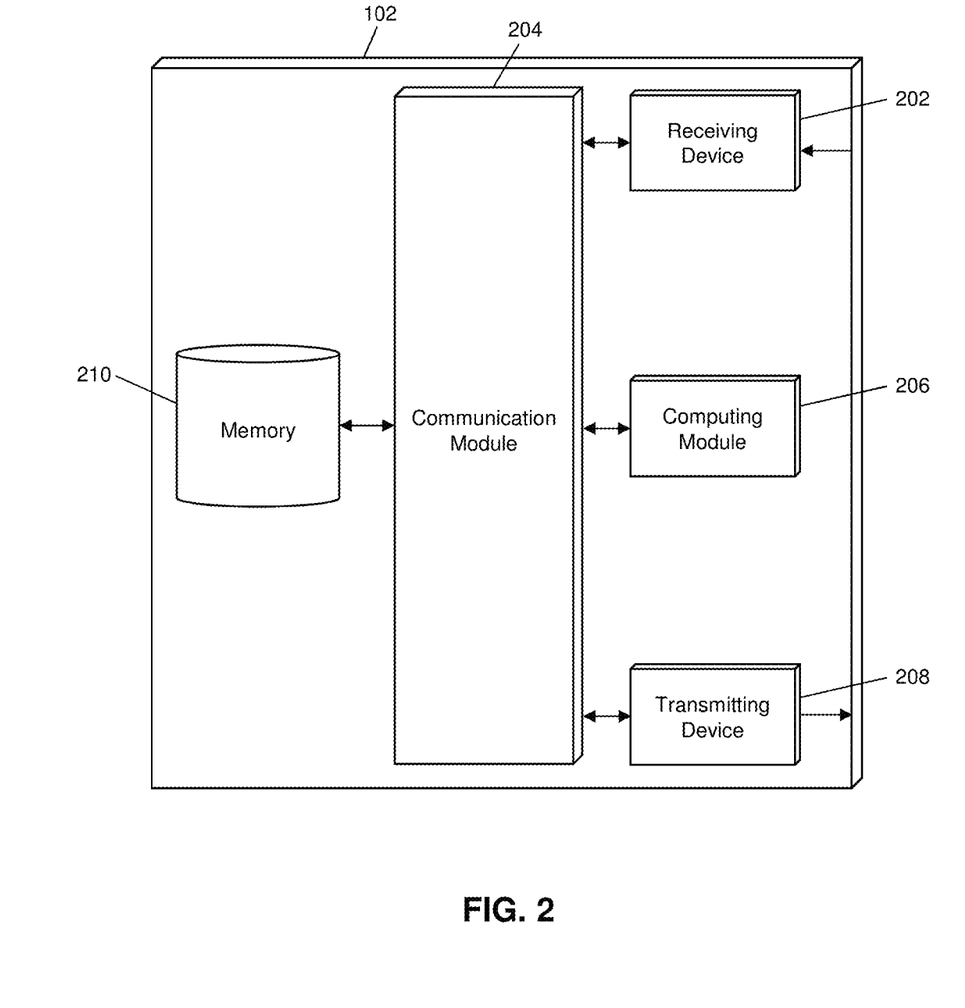
FIG. 2 is a block diagram illustrating the network controller of the system of FIG. 1 for onboarding a new wireless extender in a wireless network in accordance with exemplary embodiments.

Referring now to FIG. 2, a block diagram illustrating the network gateway 102 of the system 100 of FIG. 1 for onboarding a new wireless extender in a wireless network is discussed further. It will be apparent to persons having skill in the relevant art that the embodiment of the network gateway 102 illustrated in FIG. 2 is provided as illustration only and may not be exhaustive to all possible configurations of the network gateway 102 suitable for performing the functions as discussed herein. For example, a computer system 500 illustrated in FIG. 5 and discussed in more detail hereinbelow may be a suitable configuration of the network gateway 102.

The network gateway 102 may include a receiving device 202. The receiving device 202 may be configured to receive data over one or more networks via one or more network protocols. In some instances, the receiving device 202 may be configured to receive data from end user devices 106, extenders 104, 108a, 108b, other access points, and other systems and entities via one or more communication methods, such as radio frequency, local wireless networks, wireless networks, cellular communication networks, Bluetooth, the Internet, etc. In some embodiments, the receiving device 202 may be comprised of multiple devices, such as different receiving devices for receiving data over different networks, such as a first receiving device for receiving data over a local wireless network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by new extender 104, extenders 108, and other access points that are superimposed or otherwise encoded with information regarding backhaul packets, traffic data, channel utilization data, status information, etc. The receiving device 202 may also be configured to receive data signals electronically transmitted by end user devices 106, which may be superimposed or otherwise encoded with scanned identifying data of new wireless extenders, and other data used in performing the functions discussed herein. In cases where the network gateway 102 is part of a router or other networking device, the receiving device 202 may also be performed to receive data signals as part of functions performed as part of the networking device, such as receiving data packets for routing within or outside of the wireless network.

The network gateway 102 may also include a communication module 204. The communication module 204 may be configured to transmit data between modules, engines, databases, memories, and other components of the network gateway 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the network gateway 102 and external components of the network gateway 102, such as externally connected databases, display devices, input devices, etc. The network gateway 102 may also include a processing device. The processing device may be configured to perform the functions of the network gateway 102 discussed herein as will be apparent to persons having skill in the relevant art. In some embodiments, the processing device may include and/or be comprised of a plurality of engines and/or modules specially configured to perform one or more functions of the processing device, such as a computing module 206, etc. As used herein, the term "module" may be software executed on hardware such that it is particularly programmed to receive an input, perform one or more processes using the input, and provides an output.

The network gateway 102 may include a computing module 206. The computing module 206 may be configured to compute secure hash algorithms. The computing module 206 may receive one or more data values to be included in the secure hash. The computing module 206 may then output the computed secure hash to an appropriate engine or module of the network gateway 102 as necessary. The computing module 206 may, for example, compute a secure hash of an identifier into a proprietary information element for a wireless extender onboarding process, etc. In some embodiments, the network gateway 102 may request an extender 108 compute the secure hash for the new extender 104, as discussed below.

The network gateway 102 may also include a transmitting device 208. The transmitting device 208 may be configured to transmit data over one or more networks via one or more network protocols. In some instances, the transmitting device 208 may be configured to transmit data to extenders 104, 108a, 108b, client devices 106, other access points, and other entities via one or more communication methods, local wireless networks, cellular communication, Bluetooth, radio frequency, the Internet, etc. In some embodiments, the transmitting device 208 may be comprised of multiple devices, such as different transmitting devices for transmitting data over different networks, such as a first transmitting device for transmitting data over a local wireless network and a second transmitting device for transmitting data via the Internet. The transmitting device 208 may electronically transmit data signals that have data superimposed that may be parsed by a receiving computing device. In some instances, the transmitting device 208 may include one or more modules for superimposing, encoding, or otherwise formatting data into data signals suitable for transmission.

The transmitting device 208 may be configured to electronically transmit data signals to end user devices 106, extenders 104, 108a, 108b, and other access points that are superimposed or otherwise encoded with wireless extender identifying data, backhaul Wi-Fi link traffic, Wi-Fi beacon information, and other data that may be used in wireless extender onboarding as discussed herein. The transmitting device 208 may also be configured to electronically transmit data signals to end user devices 106 that are superimposed or otherwise encoded with onboarding result data.

The network gateway 102 may also include a memory 210. The memory 210 may be configured to store data for use by the network gateway 102 in performing the functions discussed herein, such as public and private keys, symmetric keys, etc. The memory 210 may be configured to store data using suitable data formatting methods and schema and may be any suitable type of memory, such as read-only memory, random access memory, etc. The memory 210 may include, for example, encryption keys and algorithms, communication protocols and standards, data formatting standards and protocols, program code for modules and application programs of the processing device, and other data that may be suitable for use by the network gateway 102 in the performance of the functions disclosed herein as will be apparent to persons having skill in the relevant art. In some embodiments, the memory 210 may be comprised of or may otherwise include a relational database that utilizes structured query language for the storage, identification, modifying, updating, accessing, etc. of structured data sets stored therein. The memory 210 may be configured to store, for example, lists of connected wireless extenders for performing the functions discussed herein.

Process for New Wireless Extender Onboardinq

Figure 3:
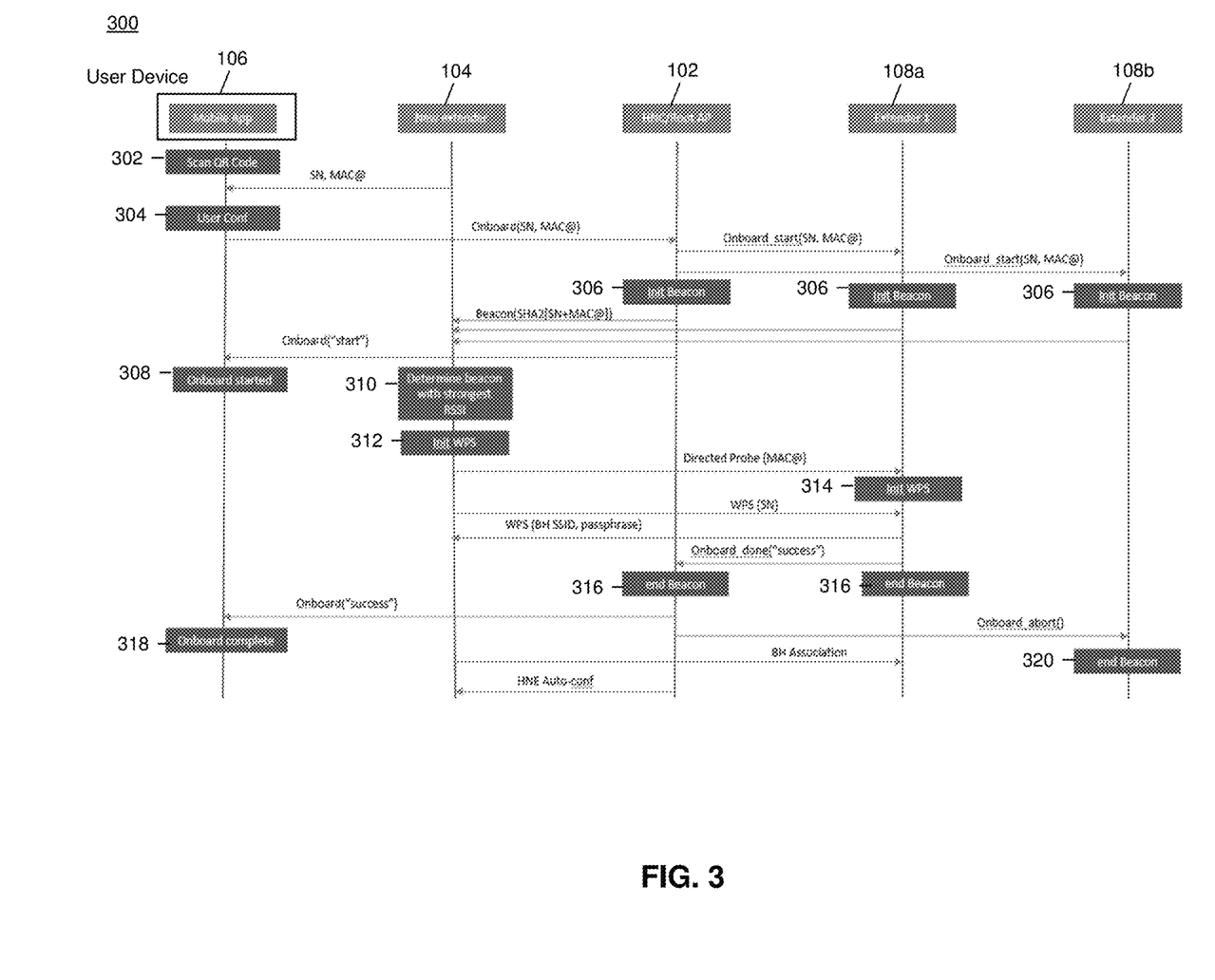
FIG. 3 is a ladder flow diagram illustrating a process for onboarding a new wireless extender in a wireless network executed by the system of FIG. 1 in accordance with exemplary embodiments.

Referring now to FIG. 3, a process 300 for onboarding a new wireless extender, such as the new wireless extender 104 of FIG. 1, in a wireless network executed by the system 100 of FIG. 1 is discussed further. A mobile application on an end user device, such as the end user device 106 of FIG. 1, asks the end user to scan a quick response (QR) code of a sticker on the new wireless extender 104 at step 302. The QR code represents at least one of: a serial numbers, one or more media access control (MAC) addresses, or other suitable data of the new wireless extender 104. One of ordinary skill in the art will appreciate that other identifying data may be represented by the QR code. The mobile application, controlled by the user, may scan the QR code and extract the identifying data of the new wireless extender 104. At step 304, the user may confirm that the QR code has been scanned and the correct identifying data has been extracted.

The end user device 106 may transmit an onboard signal comprising the identifying data to a home network controller and/or a root access point, such as the network gateway 102 of FIG. 1. In one embodiment, the mobile application writes the identifying data of the new wireless extender 104 to the network gateway 102 through a secured Wi-Fi connection. In response to the receiving the onboard signal, the network gateway 102 may start an onboarding state machine by starting a timer, switching to an ongoing status, and transmitting an onboarding start signal to existing wireless extenders currently connected to the wireless network, such as the existing wireless extenders 108a, 108b of FIG. 1.

The network gateway 102 may then compute a secure hash of the identifying data and include the result in beacons of the network gateway's 102 access point. The secure hash may be provided into a proprietary information element at step 306. Also at step 306, the network gateway 102 may communicate to the existing wireless extenders 108 to include the secure hash in the beacons of their access points. In some embodiments, this communication is transmitted through a proprietary home network extender (HNE) protocol. In some embodiments, the network gateway 102 may transmit the identifying data for the new extender 104 to the existing wireless extenders 108, where the existing wireless extenders 108 may be configured to compute the secure hash of the identifying data and include the secure hash in the proprietary information element.

The new wireless extender 104 listens to the beacons of the network gateway 102 and the existing wireless extenders 108. The new wireless extender 104 may recognize the secure hash and the identifying data, such as the serial number and the media access control address, in the proprietary information elements. At step 308, the mobile application receives an onboard start signal from the network gateway 102 and starts the onboard process.

At step 310, the new wireless extender 104 may select a backhaul service set identifier (BSSID) broadcasting a beacon including the information element with the secure hash and having a strongest received signal strength indictor (RSSI). At step 312, the new wireless extender 104 initializes a Wi-Fi Protected Setup (WPS) pairing session as an enrollee. WPS is a network security standard for wireless home networks set by the Wi-Fi Alliance, and is describe on the web at wi-fi.org, for instance. In a principle version of the registration protocol of WPS a series of EAP message exchanges, is described as below:

Enrollee->Registrar: M1=Version|| N1|| Description|| PKE
Enrollee<-Registrar: M2=Version|| N1|| N2|| Description|| PKR [ ||ConfigData] || HMAC_AuthKey(M1|| M2*)
Enrollee->Registrar: M3=Version|| N2|| E-Hash1|| E-Hash2|| HMAC_AuthKey(M2|| M3*)
Enrollee<-Registrar: M4=Version|| N1|| R-Hash1|| R-Hash2|| ENC_KeyWrapKey(R-S1)|| HMAC_AuthKey (M3|| M4*)
Enrollee->Registrar: M5=Version|| N2|| ENC_KeyWrapKey (E-S1)|| HMAC_AuthKey (M4|| M5*)
Enrollee<-Registrar: M6=Version|| N1|| ENC_KeyWrapKey (R-S2)|| HMAC_AuthKey (M5|| M6*)
Enrollee->Registrar: M7=Version|| N2|| ENC_KeyWrapKey (E-S2 [||ConfigData]) II HMAC_AuthKey (M6|| M7*)
Enrollee<-Registrar: M8=Version|| N1|| [ENC_KeyWrapKey(ConfigData)] || HMAC_AuthKey (M7|| M8*),
where || this symbol means concatenation of parameters to form a message; Mn* is message Mn excluding the HMAC-SHA-256 value; Version identifies the type of Registration Protocol message; N1 is a 128-bit random number (nonce) specified by the Enrollee; N2 is a 128-bit random number (nonce) specified by the Registrar; Description contains a human-readable description of the sending device (UUID, manufacturer, model number, MAC address, etc.) and device capabilities such as supported algorithms, I/O channels, Registration Protocol role, etc. Description data is also included in an 802.11 probe request and probe response messages.

HMAC_AuthKey( . . . ) indicates an Authenticator attribute that contains a HMAC keyed hash over the values in parentheses and using the key AuthKey.

ENC_KeyWrapKey( . . . ) indicates symmetric encryption of the values in parentheses, using the key KeyWrapKey. PKE and PKR are Diffie-Hellman public keys of the Enrollee and Registrar, respectively. AuthKey is an authentication key derived from the Diffie-Hellman secret, the nonces N1 and N2, and the Enrollee's MAC address. E-Hash1 and E-Hash2 are pre-commitments made by the Enrollee to prove knowledge of the two halves of its own device password. R-Hash1 and R-Hash2 are pre-commitments made by the Registrar to prove knowledge of the two halves of the Enrollee's device password. R-S1 and R-S2 are secret 128-bit nonces that, together with R-Hash1 and R-Hash2, can be used by the Enrollee to confirm the Registrar's knowledge of the first and second half of the Enrollee's device password, respectively. E-S1 and E-S2 are secret 128-bit nonces that, together with E-Hash1 and E-Hash2, can be used by the Registrar to confirm the Enrollee's knowledge of the first and second half of the Enrollee's device password, respectively. ConfigData contains WLAN settings and Credentials for the Enrollee.

The new wireless extender 104 may then send a directed probe request including the MAC address to the BSSID (selected access point). The selected access point (AP) may receive the directed probe and recognize the MAC address. The selected access point may then initiate a WPS pairing session as a registrar and access point WPS session at step 314.

The new wireless extender 104, as the enrollee, may include into the WPS an M1 message with its own serial number. In response to receiving any M1 message with a serial number not provided in the identifying data, the AP may abort the WPS procedure. In response to receiving an M1 message with the correct serial number, the AP may accept the new wireless extender 104. In response to accepting the new wireless extender 104, the AP may transmit a WPS signal including the backhaul credentials (e.g., SSID and passphrase) in an M2 message to the new wireless extender 104. At step 316, the beacons of the network gateway 102 and the existing wireless extenders 108 used in the onboarding may be terminated and the WPS pairing session may be closed successfully by all parties.

The network gateway 102 may communicate an onboarding results message to the mobile application, such as, but not limited to, a message indicating a successful onboard. The network gateway 102 may then communicate to the existing wireless extenders 108 not involved in the onboarding to abort onboarding. At step 318, the mobile application may identify that the onboarding is complete. In response to receiving the abort onboarding signal, the existing wireless extenders 108 not involved in the onboarding may terminate the beacon at step 320.

The new wireless extender 104 may join the backhaul (ESS) with the credentials retrieved from the WPS pairing sessions. The new wireless extender 104 may then get an internet protocol (IP) address from a Home Network Dynamic Host Configuration Protocol (DHCP) server. A proprietary HNE discovery and auto-configuration may finalize the network onboarding of the new wireless extender 104.

In some embodiments, an onboarding state machine may wait for successful addition of an expected new wireless extender into a Home Network Controller (HNC) table. The state machine may poll for any WPS failures occurring at controlled access points. In case of success, failure, or time out, the state machine may terminate the procedure by updating the status and a reason. The timer may then be stopped and the secure hash may be removed from the beacons of the access points (network gateway 102 and existing wireless extenders 108).

The mobile application may wait for completion of the onboarding operation and may be informed about a result by polling into a gateway data model. If the operation is successful, the mobile application may monitor the RSSI of the onboarded new wireless extender 104 and may help the end user place the new wireless extender 104 at a best location that optimizes wireless coverage versus throughput performances.

In some embodiments, the process 300 may comprise a 2-way authentication secured to avoid neighboring extenders from being wrongly onboarded and also avoid a wireless extender from being wrongly onboarded to a neighboring network gateway. The serial number information received in the WPS M1 message discussed above may be kept secret by being transmitted with encryption over the air to prevent external attacks. In one embodiment, the secure hash algorithm used may be Secure Hash Algorithm 2 (SHA-2).

Exemplary Method for New Wireless Extender Onboardinq

Figure 4:
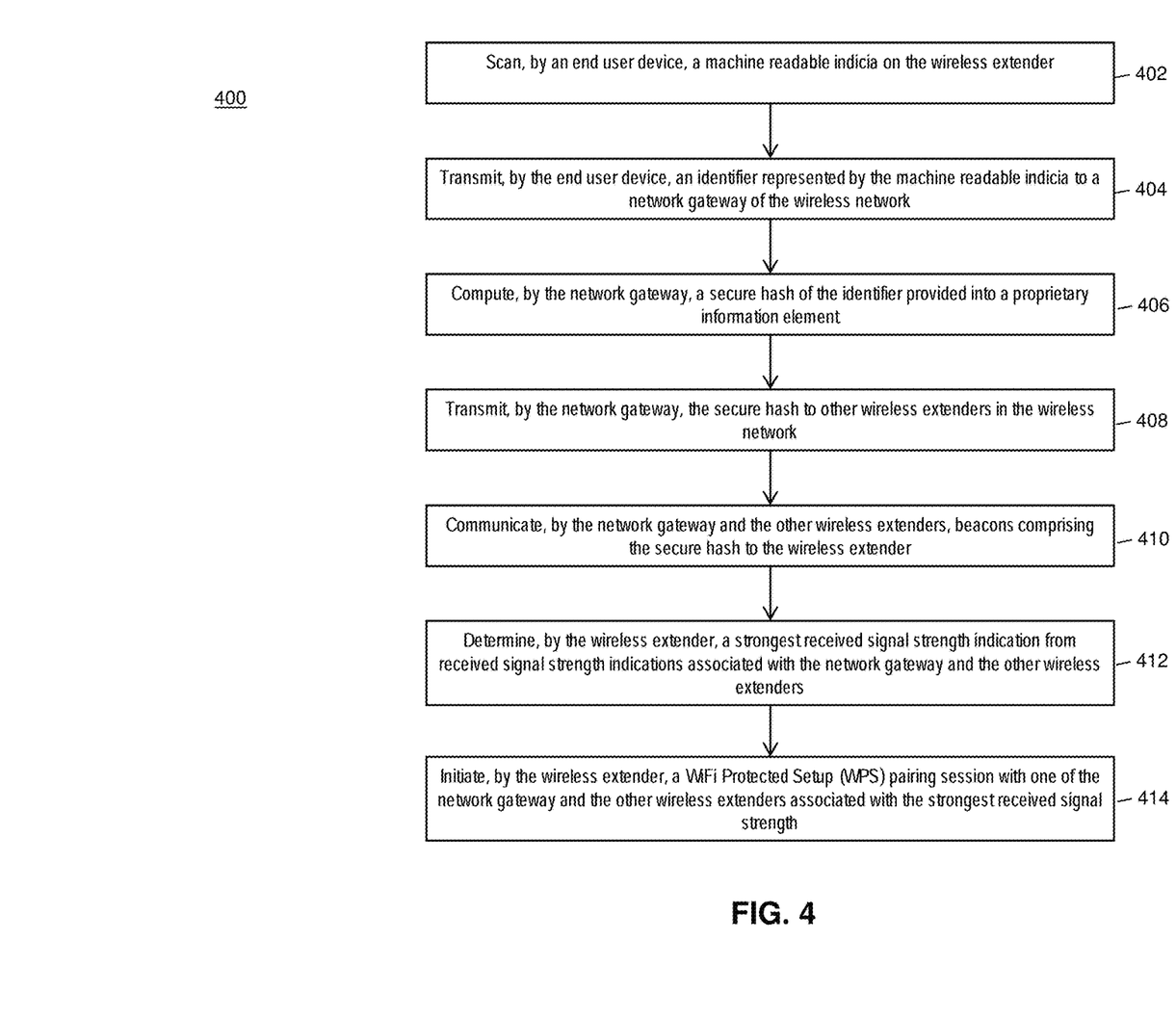
FIG. 4 is a flow chart illustrating an exemplary method for onboarding a new wireless extender in a wireless network in accordance with exemplary embodiments.

Referring now to FIG. 4, a method for onboarding a new wireless extender in a wireless network is discussed further. In step 402, a machine-readable indicia on a wireless extender, such as the new wireless extender 104 of FIG. 1, may be scanned by an end user device, such as the end user device 106 of FIG. 1. In step 404, the end user device 106 may transmit an identifier represented by the machine readable indicia to a network gateway, such as the network gateway 102 of FIG. 1, of the wireless network.

In step 406, the network gateway 102 may compute a secure hash of the identifier provided into a proprietary information element. In step 408, the network gateway 102 may transmit the secure hash to existing wireless extenders, such as the existing wireless extenders 108a, 108b of FIG. 1, in the wireless network. In step 410, the network gateway 102 and the existing wireless extenders 108 may communicate beacons comprising the secure hash to the new wireless extender 104.

In step 412, the new wireless extender 104 may determine a strongest received signal strength indication from received signal strength indications associated with the network gateway 102 and the existing wireless extenders 108. In step 414, the new wireless extender 104 may initiate a Wi-Fi Protected Setup (WPS) pairing session with one of the network gateway 102 and the existing wireless extenders 108 associated with the strongest received signal strength.

In some embodiments, the identifier may comprise at least a serial number and a media access control (MAC) address. In some embodiments, the machine readable indicia may comprise a quick response (QR) code. In some embodiments, the end user device 106 may transmit the identifier to the network gateway 102 through a secured Wi-Fi connection. In some embodiments, the beacons of the network gateway 102 and existing wireless extenders 108 may comprise beacons of access points. In some embodiments, the new wireless extender 104 may determine the strongest received signal strength indication and initiate the WPS pairing session in response to the new wireless extender 104 recognizing the secure hash and the identifier. In one embodiment, the identifier may be transmitted to the existing wireless extenders in place of the secure hash, where the existing wireless extenders may compute the secure hash of the identifier.

In some embodiments, the new wireless extender 104 may initiate the WPS pairing session as an enrollee, send a probe request to the network gateway 102 or existing wireless extender 108 associated with the strongest received signal strength indication, and receive a request to initiate a second WPS pairing session as a registrar and access point WPS session from the network gateway 102 or existing wireless extender 108 associated with the strongest received signal strength indication.

In some embodiments, the new wireless extender 104 may join a backhaul extended service set (ESS) with credentials retrieved from the registrar and access point WPS session and receive an internet protocol (IP) address from a home network dynamic host configuration protocol (DHCP) server. In some embodiments, the end user device 106 may receive a result of the new wireless extender 104 onboarding, wherein the result comprises at least one of indicating a successful onboarding and an error message.

In some embodiment, the network gateway 102 and the existing wireless extenders 108 may include the secure hash in the beacons for a limited period of time and automatically remove the secure hash from the beacons upon the expiration of the limited period of time.

Computer System Architecture

Figure 5:
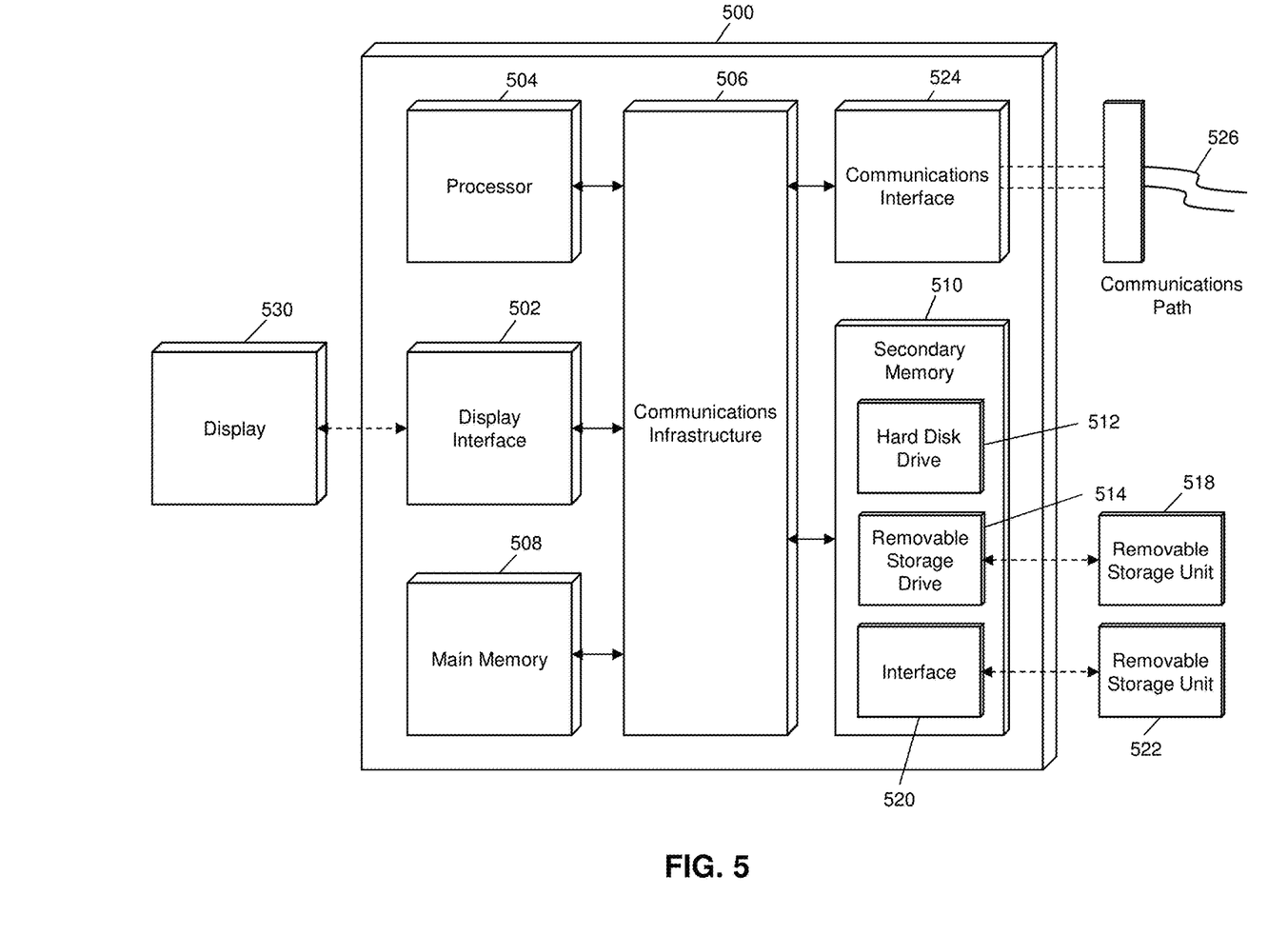
FIG. 5 is a block diagram illustrating a computer system architecture in accordance with exemplary embodiments.

Referring now to FIG. 5, a computer system 500 in which embodiments of the present disclosure, or portions thereof, may be implemented as computer-readable code is discussed further. For example, the network gateway 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local wireless network (LAN), a wide wireless network (WAN), a wireless network (e.g., Wi-Fi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, Wi-Fi, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for onboarding a new wireless extender in a wireless network. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for onboarding of a new wireless extender in a wireless network, comprising:

scanning, by an end user device, a machine-readable indicia on the new wireless extender;
transmitting, by the end user device to a network gateway of the wireless network, an identifier represented by the machine-readable indicia;
computing, by the network gateway, a secure hash of the identifier provided into a proprietary information element;
transmitting, by the network gateway, the secure hash and identifier to existing wireless extenders in the wireless network;
communicating, by the network gateway and the existing wireless extenders, beacons comprising the secure hash to the new wireless extender;
determining, by the new wireless extender, a strongest received signal strength indication from received signal strength indications associated with the network gateway and the existing wireless extenders;
initiating, by the new wireless extender, a Wi-Fi Protected Setup (WPS) pairing session as an enrollee with one of the network gateway and the existing wireless extenders associated with the strongest received signal strength, wherein the new wireless extender recognizes the secure hash;
sending, by the new wireless extender, a probe request to the network gateway or existing wireless extender associated with the strongest received signal strength indication, wherein the probe request includes a media access control (MAC) address of the enrollee; and
receiving, by the new wireless extender from the one of the network gateway or the existing wireless extender associated with the strongest received signal strength indication, the probe request including the MAC address so as to initiate the WPS pairing session as registrar.

2. The method according to claim 1, wherein the identifier comprises at least a serial number and a MAC address.

3. The method according to claim 1, wherein the machine-readable indicia comprises a quick response (QR) code.

4. The method according to claim 1, wherein the end user device transmitting the identifier to the network gateway comprises transmitting the identifier to the network gateway through a secured Wi-Fi connection.

5. The method according to claim 1, wherein the beacons, communicated by the network gateway and the existing wireless extenders, comprise beacons of access points.

6. The method according to claim 1, wherein the determining the strongest received signal strength indication and the initiating the WPS pairing session comprises determining the strongest received signal strength indication and initiating the WPS pairing session in response to the new wireless extender recognizing the secure hash and the identifier.

7. The method according to claim 1, further comprising:
joining, by the new wireless extender, a backhaul extended service set (ESS) with credentials retrieved from a registrar and access point WPS session; and
receiving, by the new wireless extender from a home network dynamic host configuration protocol (DHCP) server, an internet protocol (IP) address.

8. The method according to claim 1, further comprising communicating, via the end user device, a result of the onboarding of the new wireless extender, wherein the result comprises at least one of indicating a successful onboarding and an error message.

9. The method according to claim 1, wherein the network gateway and the existing wireless extenders are configured to:
include the secure hash in the beacons for a limited period of time; and
automatically remove the secure hash from the beacons upon an expiration of the limited period of time.

10. A system for onboarding of a new wireless extender in a wireless network, comprising:
a network gateway connected to the wireless network;
an end user device connected to the wireless network configured to:
scan a machine-readable indicia on the new wireless extender; and
transmit an identifier represented by the machine-readable indicia to the network gateway; and
a plurality of existing wireless extenders currently connected to the wireless network;
wherein the network gateway is configured to:
compute a secure hash of the identifier provided into a proprietary information element; and
transmit the secure hash and the identifier to existing wireless extenders in the wireless network;
wherein the network gateway and the existing wireless extenders are further configured to communicate beacons comprising the secure hash to the new wireless extender; and
wherein the new wireless extender is configured to:
determine a strongest received signal strength indication from received signal strength indications associated with the network gateway and the existing wireless extenders;
initiate a Wi-Fi Protected Setup (WPS) pairing session as an enrollee with one of the network gateway and the existing wireless extenders associated with the strongest received signal strength, wherein the new wireless extender recognizes the secure hash;
send, by the new wireless extender, a probe request to the network gateway or existing wireless extender associated with the strongest received signal strength indication, wherein the probe request includes a media access control (MAC) address of the enrollee; and
receive, by the new wireless extender from the network gateway or existing wireless extender associated with the strongest received signal strength indication, the probe request including the MAC address so as to initiate the WPS pairing session as registrar.

11. The system according to claim 10, wherein the identifier comprises at least a serial number and the MAC address.

12. The system according to claim 10, wherein the machine-readable indicia comprises a quick response (QR) code.

13. The system according to claim 10, wherein the end user device being configured to transmit the identifier to the network gateway comprises the end user device being further configured to transmit the identifier to the network gateway through a secured Wi-Fi connection.

14. The system according to claim 10, wherein the beacons, communicated by the network gateway and the existing wireless extenders, comprise beacons of access points.

15. The system according to claim 10, wherein the new wireless extender being configured to determine the strongest received signal strength indication and to initiate the WPS pairing session comprises the new wireless extender being further configured to:
determine the strongest received signal strength indication and initiate the WPS pairing session in response to the new wireless extender recognizing the secure hash and the identifier.

16. The system according to claim 10, wherein the new wireless extender is further configured to:
join a backhaul extended service set (ESS) with credentials retrieved from a registrar and access point WPS session; and
receive an internet protocol (IP) address from a home network dynamic host configuration protocol (DHCP) server.

17. The system according to claim 10, wherein the network gateway and the existing wireless extenders are further configured to:
include the secure hash in the beacons for a limited period of time; and
automatically remove the secure hash from the beacons upon an expiration of the limited period of time.

18. A method for onboarding of a new wireless extender in a wireless network, comprising:
scanning, by an end user device, a machine-readable indicia on the new wireless extender;
transmitting, by the end user device to a network gateway of the wireless network, an identifier represented by the machine-readable indicia;
transmitting, by the network gateway, the identifier to existing wireless extenders in the wireless network
computing, by each of the existing wireless extenders, a secure hash of the identifier provided into a proprietary information element;
communicating, by the network gateway and the existing wireless extenders, beacons comprising the secure hash to the new wireless extender;
determining, by the new wireless extender, a strongest received signal strength indication from received signal strength indications associated with the network gateway and the existing wireless extenders; and
initiating, by the new wireless extender, a Wi-Fi Protected Setup (WPS) pairing session as an enrollee with one of the network gateway and the existing wireless extenders associated with the strongest received signal strength, wherein the new wireless extender recognizes the secure hash;
sending, by the new wireless extender, a probe request to the network gateway or existing wireless extender associated with the strongest received signal strength indication, wherein the probe request includes a media access control (MAC) address of the enrollee; and
receiving, by the new wireless extender from the one of the network gateway or the existing wireless extender associated with the strongest received signal strength indication, the probe request including the MAC address so as to initiate the WPS pairing session as registrar.

19. A system for new wireless extender onboarding in a wireless network, comprising:
a network gateway connected to the wireless network;
an end user device connected to the wireless network configured to:
scan a machine-readable indicia on the new wireless extender; and
transmit an identifier represented by the machine-readable indicia to the network gateway; and
a plurality of existing wireless extenders currently connected to the wireless network;

wherein the existing wireless extenders are configured to compute a secure hash of the identifier provided into a proprietary information element;

wherein the network gateway and the existing wireless extenders are further configured to communicate beacons comprising the secure hash to the new wireless extender; and wherein the new wireless extender is configured to:

determine a strongest received signal strength indication from received signal strength indications associated with the network gateway and the existing wireless extenders; and initiate a Wi-Fi Protected Setup (WPS) pairing session as an enrollee with one of the network gateway and the existing wireless extenders associated with the strongest received signal strength, wherein the new wireless extender recognizes the secure hash;

sending, by the new wireless extender, a probe request to the network gateway or existing wireless extender associated with the strongest received signal strength indication, wherein the probe request includes a media access control (MAC) address of the enrollee; and receiving, by the new wireless extender from the one of the network gateway or the existing wireless extender associated with the strongest received signal strength indication, the probe request including the MAC address so as to initiate the WPS pairing session as registrar.

* * * * *